D. W. THOMPSON.
Improvement in Fruit-Gatherers.
No. 130,769.                             Patented Aug. 20, 1872.
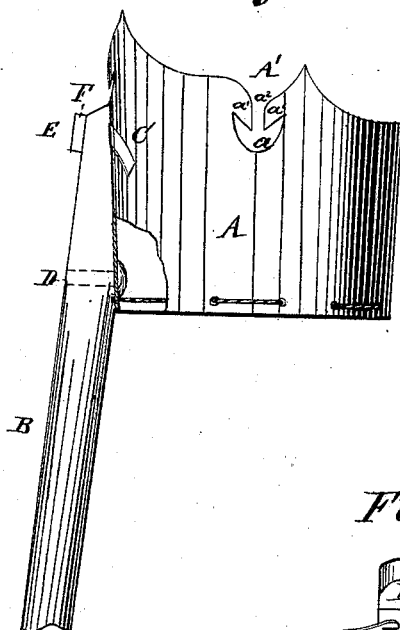
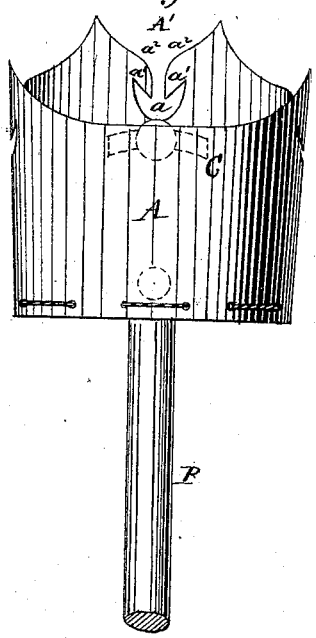
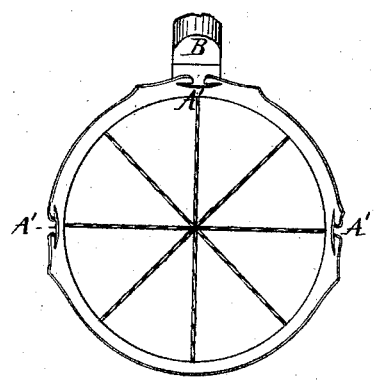
Witnesses:
G. Matthys.
Thos. S. H. Ourand.
Inventor:
David W. Thompson
Per Munn & Co.
Attorneys.

UNITED STATES PATENT OFFICE.

DAVID W. THOMPSON, OF ST. JOSEPH, MISSOURI.

IMPROVEMENT IN FRUIT-GATHERERS.

Specification forming part of Letters Patent No. 130,769, dated August 20, 1872.

Specification describing a Fruit-Picker, invented by DAVID W. THOMPSON, of St. Joseph, in the county of Buchanan and State of Missouri.

The invention relates to that class of fruit-pickers provided with a long handle, a vessel at the upper end to receive the fruit, and some means to detach the said fruit from the branches. The invention consists in the mode of detaching the fruit by one or more traps on the upper edge of the vessel, and in the mode of attaching the handle, so that any desired lean or inclination may be given to the fruit-receiving vessel.

In the drawing, Figure 1 is a side elevation. Fig. 2 is a front elevation, and Fig. 3 is a top view.

A represents the fruit-receptacle, and B the handle. The vessel A is made of metal, and provided with one or more traps, A', formed of recesses or cavities $a$ and overlapping projections $a^1$ $a^1$, whose outer edges rise upon a curvilinear incline, $a^2$. The traps may be located at intervals around the edge of the receptacle, and may be larger or smaller, while the projections $a^1$ may or may not be sharpened on the lower edge of each. The operator places the receptacle A so that the stem or twig to which the fruit is attached is brought upon one of the inclines $a^2$, and then, by pressing the vessel up toward said stem or twig, he forces it to pass within a cavity, $a$. By then pressing the side of vessel upon the fruit the latter is detached and drops into the former. By changing from one trap to another he may fill the vessel more uniformly. The fruit-receptacle A is arc-slotted at C, provided with a series of holes arranged in the arc of a circle, while the handle B is pivoted on a bolt, D, and allowed to turn on said bolt to change its relative position to the vessel. It is clamped by a screw-bolt, E, and clamp-nut F, operated in connection with the slot C. When the nut F is loosened the screw-bolt E can be moved around in the slot C, and thus secure the adjustment of the receptacle at any obliquity desired to the handle. This adapts the picker conveniently either to spreading or upright branches. The bottom of the vessel is perforated with a series of holes, through which strings may be passed to form a bottom, or by which a fabric may be attached for the same purpose, or a cloth sack may be used.

Having thus described my invention, what I claim as new, and desire to secure by Letters Patent, is—

1. The fruit-picker A B, provided with a series of traps, A', each consisting of recess $a$, overlapping projections $a^1$ $a^1$, and curvilinear incline $a^2$, as described.

2. A fruit-receptacle, A, provided with an arc-slot, C, to adapt it to be adjusted on the clamp-screw of handle, as described.

DAVID W. THOMPSON.

Witnesses:
    J. B. DUKE,
    L. FAXON.